United States Patent
Vigil

(10) Patent No.: US 7,702,532 B2
(45) Date of Patent: Apr. 20, 2010

(54) METHOD, SYSTEM AND STORAGE MEDIUM FOR UTILIZING TRAINING ROADMAPS IN A CALL CENTER

(75) Inventor: Shirley Vigil, Smyma, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 1456 days.

(21) Appl. No.: 10/735,044

(22) Filed: Dec. 12, 2003

(65) Prior Publication Data

US 2005/0131747 A1   Jun. 16, 2005

(51) Int. Cl.
    *G06F 9/44* (2006.01)
(52) U.S. Cl. .......................................................... 705/7
(58) Field of Classification Search ...................... 705/7
    See application file for complete search history.

(56) References Cited

U.S. PATENT DOCUMENTS

| | | | |
|---|---|---|---|
| 3,611,313 A | | 10/1971 | Moser et al. |
| 5,452,350 A | | 9/1995 | Reynolds et al. |
| 5,726,914 A | * | 3/1998 | Janovski et al. ............... 705/11 |
| 5,987,443 A | * | 11/1999 | Nichols et al. ................. 706/11 |
| 6,119,097 A | * | 9/2000 | Ibarra ........................... 705/11 |
| 6,324,282 B1 | * | 11/2001 | McIllwaine et al. .... 379/265.06 |
| 6,438,353 B1 | * | 8/2002 | Casey-Cholakis et al. ... 434/350 |
| 6,603,854 B1 | | 8/2003 | Judkins et al. |
| 6,606,480 B1 | * | 8/2003 | L'Allier et al. ............. 434/362 |
| 6,735,570 B1 | * | 5/2004 | Lacy et al. ...................... 705/7 |
| 6,741,697 B2 | | 5/2004 | Benson et al. |
| 6,754,874 B1 | * | 6/2004 | Richman .................... 715/205 |
| 6,760,727 B1 | | 7/2004 | Schroeder et al. |
| 6,807,535 B2 | * | 10/2004 | Goodkovsky .................. 706/3 |
| 6,847,711 B2 | | 1/2005 | Knott et al. |
| 6,859,523 B1 | * | 2/2005 | Jilk et al. .................. 379/32.01 |
| 6,944,596 B1 | * | 9/2005 | Gray et al. ...................... 705/1 |
| 6,944,624 B2 | * | 9/2005 | Orton et al. ................. 707/102 |
| 7,035,809 B2 | * | 4/2006 | Miller et al. .................... 705/8 |

(Continued)

FOREIGN PATENT DOCUMENTS

EP   1011256   6/2000

(Continued)

OTHER PUBLICATIONS

Horney, Bryan, Implementing a Management Control System Retail Control, vol. 52, No. 7, Mar. 1994, Abstract.*

(Continued)

*Primary Examiner*—Scott L Jarrett
(74) *Attorney, Agent, or Firm*—Cantor Colburn LLP

(57) ABSTRACT

Embodiments of the invention relate to a method, system, and storage medium for providing a disciplined approach to business management activities. The method includes developing an activity list of tasks and behaviors that relate to an identified opportunity, performing a time study of observable behaviors associated with the activity, and collecting data resulting from the time study and the performance of work activities. The method also includes identifying issues presented as a result of analyzing the data, generating and implementing a roadmap for resolving the issues, and training individuals affected by the roadmap in accordance with action items contained in the roadmap. The method further includes forecasting future resource requirements based upon reports generated as a result of collecting the data and identifying the issues.

19 Claims, 11 Drawing Sheets

U.S. PATENT DOCUMENTS

| | | | |
|---|---|---|---|
| 7,092,509 B1* | 8/2006 | Mears et al. | 379/266.01 |
| 7,092,821 B2* | 8/2006 | Mizrahi et al. | 702/1 |
| 7,153,140 B2* | 12/2006 | Ivanir et al. | 434/322 |
| 7,158,628 B2* | 1/2007 | McConnell et al. | 379/265.02 |
| 7,188,169 B2* | 3/2007 | Buus et al. | 709/224 |
| 7,367,808 B1* | 5/2008 | Frank et al. | 705/11 |
| 7,483,842 B1* | 1/2009 | Fung et al. | 705/11 |
| 7,596,507 B2* | 9/2009 | Gibson | 705/11 |
| 2001/0008999 A1* | 7/2001 | Bull | 705/11 |
| 2001/0039002 A1* | 11/2001 | Delehanty | 434/322 |
| 2002/0123983 A1* | 9/2002 | Riley et al. | 707/1 |
| 2002/0198765 A1* | 12/2002 | Magrino et al. | 705/11 |
| 2003/0101091 A1* | 5/2003 | Levin et al. | 705/11 |
| 2003/0129575 A1* | 7/2003 | L'Allier et al. | 434/362 |
| 2003/0182178 A1* | 9/2003 | D'Elena et al. | 705/11 |
| 2003/0229529 A1* | 12/2003 | Mui et al. | 705/8 |
| 2004/0009462 A1* | 1/2004 | McElwrath | 434/350 |
| 2004/0014016 A1* | 1/2004 | Popeck et al. | 434/322 |
| 2004/0029093 A1* | 2/2004 | Guignard | 434/365 |
| 2004/0068431 A1* | 4/2004 | Smith et al. | 705/10 |
| 2004/0102926 A1* | 5/2004 | Adendorff et al. | 702/182 |
| 2004/0138941 A1* | 7/2004 | Salgado | 705/10 |
| 2005/0043976 A1* | 2/2005 | Leehman | 705/7 |
| 2005/0043987 A1* | 2/2005 | Kumar et al. | 705/11 |
| 2006/0123060 A1* | 6/2006 | Allen et al. | 707/200 |
| 2006/0240396 A1* | 10/2006 | Foo et al. | 434/350 |
| 2007/0203711 A1* | 8/2007 | Nation et al. | 705/1 |

FOREIGN PATENT DOCUMENTS

| | | |
|---|---|---|
| GB | 2336066 | 10/1999 |
| WO | WO 01/02597 A1 * | 4/2001 |

OTHER PUBLICATIONS

Denton, Keith D., Work Sampling: Increasing Service and White Collar Productivity Management Solutions, vol. 32, No. 3, Mar. 1987.*

Michaels, Edwards A., Work Measurement Small Business Reports, vol. 14, No. 3, Mar. 1989.*

Wilde, Edwin, A performance control system Engineering Management Journal, Oct. 1993.*

Baines, Anna, Work measurement—the basic principles revisited Work Study, vol. 44, No. 7, Sep./Oct. 1995.*

Kaplan, Robert S. et al., Linking the Balanced Scorecard to Strategy California Management Review, vol. 39 No. 1, Fall 1996.*

Maskell, Brian H., Performance Measurement for World Class Manufacturing Productivity Press, 1991, ISBN: 0-915299-99-2.*

Kaydos, Will, Operational Performance Measurement CRC Press, 1999, ISBN: 1-5744-099-3.*

Michaels, Edward, Work Measurement Small Business Reports, vol. 14, No. 3, Mar. 1989).*

Kaplan et al., Linking the Balanced Scorecard to Strategy California Management Reivew, vol. 39, No. 1, Fall 1996.*

Grant, Rebecca A. et al., Computerized Performance Monitors as Multidimensional Systems: Derivation and Application ACM Transactions on Information Systems, vol. 14, No. 2, Apr. 1996.*

Elwell, Ron et al., When You Think Monitoring Think John Smith Call Center Solutions, vol. 17, No. 12, Jun. 1999.*

Coen, Dan, Creating a Dynamic Performance Development Program Direct Marketing, vol. 64, No. 3, Jul. 2001.*

Emvolve Performance Managmer Release 1.5 Customer Interaction Solutions, vol. 20, No. 5, 2001.*

Televista Integrates eLearning and Quality Monitoring The Ascent Group, Inc, Aug. 2001.*

PrimeTime F&S version 1.3—User's Guide Blue Pumpkin Software, Inc. 1997-1998.*

Reynolds, Penny, The science of call center management Communication News, vol. 35, No. 10, Oct. 1998.*

Clcik2Coach brochure Envision Telephony, 2000.*

Call Center Dashboard—Agent scorecard for talk time, calls answered, hold time, escalations The Dashboard Spy, Apr. 12, 2006.*

Michaels, Edward, Work Measurement (1989).*

Kaplan et al., Linking the Balanced Scorecard to Strategy (1996).*

Denton, Keith D., Work sampling: Increasing Service and White Collar Productivity (1987).*

Wilde, Edwin, A performance control system (1993).*

Syntora.com Web Pages (agentivity) Retrieved from Syntora.com Sep. 2, 2003.

Russell, J.P., All about editing Quality Progress, vol. 33, No. 4, May 2000.

Skowronek, Larry, Aspect eWorkforce Management v6—New Features and Functionality Aspect, Jul. 30, 2001.

Pape, Elinor, Automated Work Sampling with Unbiased Variance Estimates Computer & Industrial Engineering, vol. 6, No. 1, 1982.

Brisley, Chester L. et al., Balancing Cost and Accuracy in Setting Up Standards for Work Measurement Industrial Engineering, vol. 14, No. 5, May 1982.

Pels Mary Ann et al., Benchmarking Call Center Performance Credit Union Executive, vol. 39, No. 4, Jul./Aug. 1999.

Perkins, Debra S. et al., Best Practices for Customer Service Call Centers—An Exclusive Statistical Study Telemarketing & Call Center Solutions, vol. 15, No. 10, Apr. 1997.

Read, Brenda B., Call Center Checkup Call Center Magazine, vol. 16, No. 6, Jun. 2003.

Alban, Oscar, Customer interaction monitoring: your key to measure service performance, Australian Banking & Finance, vol. 10, No. 6, Apr. 18, 2001.

Van Bodegraven, Art, Developing and Using Standards for Work Performance, Topics in Health Care Financing, vol. 15, No. 3, Spring 1989.

Fluss, Donna, How QM Recording is Changing for the Better, Call Center Magazine, vol. 18, No. 2, Feb. 2005.

Gagon, Eugene J., How to Measure Work, Material Handling Management, vol. 55, No. 2, Feb. 2000.

Carlow, Malcom et al., Managing and Motivating Contact Center Employees, McGrawHill, 2003, ISBN: 0-07-138888-5.

Bishop, Fred W., et al., Measure for Measure, Electric Perspectives, vol. 27, No. 2, Mar./Apr. 2002.

Hall, Computer Work Measurement Systems, Management Services, Feb. 1991, vol. 35, No. 2.

Chang, Richard Y., et al., Performance Scorecards, HB Printing, 2000, ISBN 0-7879-5272-9.

Epstein, Marc et al., Implementing Corporate Strategy: From Tableaux de Bord to Balanced Scorecards, European Management Journal, vol. 16, No. 2, 1998.

* cited by examiner

| ACTIVITY LIST SUMMARY | | | | STATE: GA<br>CENTER: AFIG<br>AREA: see below<br>DATE UPDATED: 5/2/2003 | | | |
|---|---|---|---|---|---|---|---|
| ACT. # | ACTIVITY | UNIT OF MEASURE | DAILY FREQ | MONTHLY VOL | EST MINS | ESM/RE MINS | % TOTAL VOL |
| | SO Processing Area | | | | | | |
| 1 | RMA Resolution | order | | | | | |
| 2 | Reuse report | reuse group | | | | | |
| 3 | QA report | order | | | | | |
| 4 | SOCS errors | error | | | | | |
| 5 | Field assist calls | call | | | | | |
| 6 | HAL report | order | | | | | |
| 7 | PAWS pending order report | order | | | | | |
| | EWO Processing Area | | | | | | |
| 8 | Basic inventory updates | item | | | | | |
| 18 | Delay/deficiency reports | report | | | | | |
| | Data Base Maintenance Area | | | | | | |
| 19 | DAVAR processing | report | | | | | |
| 20 | Defective pair reports | item | | | | | |
| 21 | E911 activities | item | | | | | |
| 22 | RSAG activities | order/item | | | | | |
| 23 | Miscellaneous data base update/correct | item | | | | | |
| 24 | DIS fallout | item | | | | | |
| 25 | LURI/RULI reports | item | | | | | |
| 26 | Pending order/past due reports | order | | | | | |
| 27 | LMOS updates | order | | | | | |
| 28 | DAML removal | wait | | | | | |
| 29 | TRAPPER center referrals | item | | | | | |
| 30 | Projects/Conversions | item | | | | | |
| | | | | 0 | TOTAL MONTHLY VOL | | |

*FIG. 10*

Daily Schedule Control

Center: _____ Group: _____

| Daily Checks | | | | | |
|---|---|---|---|---|---|
| 8am | 10am | 12pm | 2pm | 4pm | 6pm |

Over/Under (EH)

| Craft Person | | | | | |
|---|---|---|---|---|---|
| SMITH, PATRICIA R | (1.42) | (2.00) | (2.00) | (2.00) | (1.00) |

| Total Over/Under (EH) | (1.42) | (2.00) | (2.00) | (2.00) | (1.00) | 0.00 |
|---|---|---|---|---|---|---|

Department: _____
Supervisor: _____
Date: 4/30/2003

| DAILY O/U Total | DAILY Demand Hrs | DAILY Exception Hrs | DAILY HRS |
|---|---|---|---|
| (8.42) | 9.00 | | 0.00 |
| (8.42) | 9.00 | | 0.00 |

*FIG. 11*

Daily Weekly Operating Report—Area Manager

| Time Period | State | Supervisor | RC | Center Type | E | Report Runtime | G |
|---|---|---|---|---|---|---|---|
| A | B | C | D | Department | F | Report Date | H |

| DAILY STATS | | DEMAND ACTIVITIES | | | | | | | | | PERF | QUALITY | SERVICE | EFFC | HOURS | | | | | |
|---|---|---|---|---|---|---|---|---|---|---|---|---|---|---|---|---|---|---|---|---|
| EMS/RE | O/U | | | | | | | | | | | | | | | | | | | |
| EARNED HOURS | ACTUAL HOURS | | | | | | | | | | | | | | | | | | | |
| I | J | K | L | M | M | M | M | M | M | M | N | O | P | Q | R | S | S | S | S | S | T |
| | | | | | | | | | | | | O | P | Q | | | | | | |
| | | | | | | | | | | | | | P | | | | | | | |
| | | | | | | | | | | | | | P | | | | | | | |

| DAILY STATS | | DEMAND ACTIVITIES | | | | | | | PERF | QUALITY | SERVICE | EFFC | HOURS | | | |
|---|---|---|---|---|---|---|---|---|---|---|---|---|---|---|---|---|
| U | U | U | U | U | U | U | U | U | U | U | U | U | U | U | U | U |
| O/U Hours | | V | V | V | V | V | V | V | | | | | | | | |

| TOTAL SUMMARY | | | | | | | | | | | | | | | | | |
| This Week's Commitment | W | W | W | W | W | W | W | W | W | W | W | W | W | W | W | W | W |
| Next Week's Commitment | | X | X | X | X | X | X | X | | | | | | | | | |

FIG. 12

ACTION PLAN

DEPARTMENT: _____  DATE: _____

GOAL: _____

BARRIER: _____  PAGE: _____

CHAMPION: _____

PARTICIPANTS: _____

| $ ACTION PLAN STEPS | DATE DUE | WHO IS RESP.? | REVIEW DATES DATE | DATE | DATE COMP | POTENTIAL SAVINGS $ |
|---|---|---|---|---|---|---|
| | | | | | | |
| | | | | | | |
| | | | | | | |

*FIG. 13*

METHOD, SYSTEM AND STORAGE MEDIUM FOR UTILIZING TRAINING ROADMAPS IN A CALL CENTER

BACKGROUND OF THE INVENTION

The present invention relates generally to business models, and more particularly, the invention relates to a method, system, and storage medium for providing a disciplined approach to business management activities.

Supervisors and managers of business enterprises are typically trained on the job with little discipline provided concerning the various reporting requirements, behaviors that should be coached, and which metrics are important to the business. As new management comes along, to replace retired individuals or as a result of turnover, they often need to re-invent what their replacements have learned over time through experiences. A great deal of relevant knowledge and experience may be lost as a result of a change in management. This can be very wasteful and result in diminished productivity.

What is needed, therefore, is a way to provide a disciplined approach to business management activities that can be systematically implemented across an entire business management environment.

SUMMARY OF THE INVENTION

Embodiments of the invention relate to a method, system, and storage medium for providing a disciplined approach to business management activities. The method includes developing an activity list of tasks and behaviors that relate to an identified opportunity, performing a time study of observable behaviors associated with the activity, and collecting data resulting from the time study and the performance of work activities. The method also includes identifying issues presented as a result of analyzing the data, generating and implementing a roadmap for resolving the issues, and training individuals affected by the roadmap in accordance with action items contained in the roadmap. The method further includes forecasting future resource requirements based upon reports generated as a result of collecting the data and identifying the issues.

Embodiments of the invention also include a system for providing a disciplined approach for conducting business management activities. The system includes a server and a business management system executing on the server. The business management system includes a business management system model that comprises a plan phase component; an execute phase component; a report phase component; a follow-up component; a coach/train component; a forecast component; and a sustain component. The business management system develops an activity list of tasks and behaviors that relate to an identified opportunity via the plan phase component, performs a time study of observable behaviors associated with the activity via the execute phase component, and collects data resulting from said time study via the execute phase component. The business management system further collects data resulting from performance of work activities via the execute component, identifies issues presented as a result of analyzing the data via the report phase component, and generates and implements a roadmap for resolving the issues via the follow-up component. The business management system further trains individuals affected by the roadmap in accordance with action items contained in the roadmap via the coach/train component and forecasts future resource requirements based upon reports generated as a result of the data collection and issues identified via the forecast component.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 10 is a sample activity list summary that is utilized by the business management system model in exemplary embodiments;

FIG. 11 is a sample daily schedule control form that is utilized by the business management system model in exemplary embodiments;

FIG. 12 is a sample daily/weekly operating report that is utilized by the business management system model in exemplary embodiments; and FIG. 13 is a sample action plan that is utilized by the business management system model in exemplary embodiments.

DETAILED DESCRIPTION OF THE INVENTION

The business management system of the invention provides a disciplined approach to transfer knowledge from one individual or group to another individual or group. The business management system further provides a framework for new employees to learn a job based, in part, upon a knowledge database implemented by the business management system. The business management system combines selected business processes into a single business model. The business processes include process management, work measurement, and a management control model. Process management defines the entire work stream for a business enterprise, including activities and service metrics. Work measurement provides a disciplined approach to setting expectations and includes reports that help drive all levels of management to manage these expectations. The management control model provides a disciplined approach to enable supervisors to plan, execute, follow-up, report, forecast, coach, and train in accordance with the current and future needs of the business enterprise. These business processes may be customized to meet the individual requirements of any business.

Figure 1:
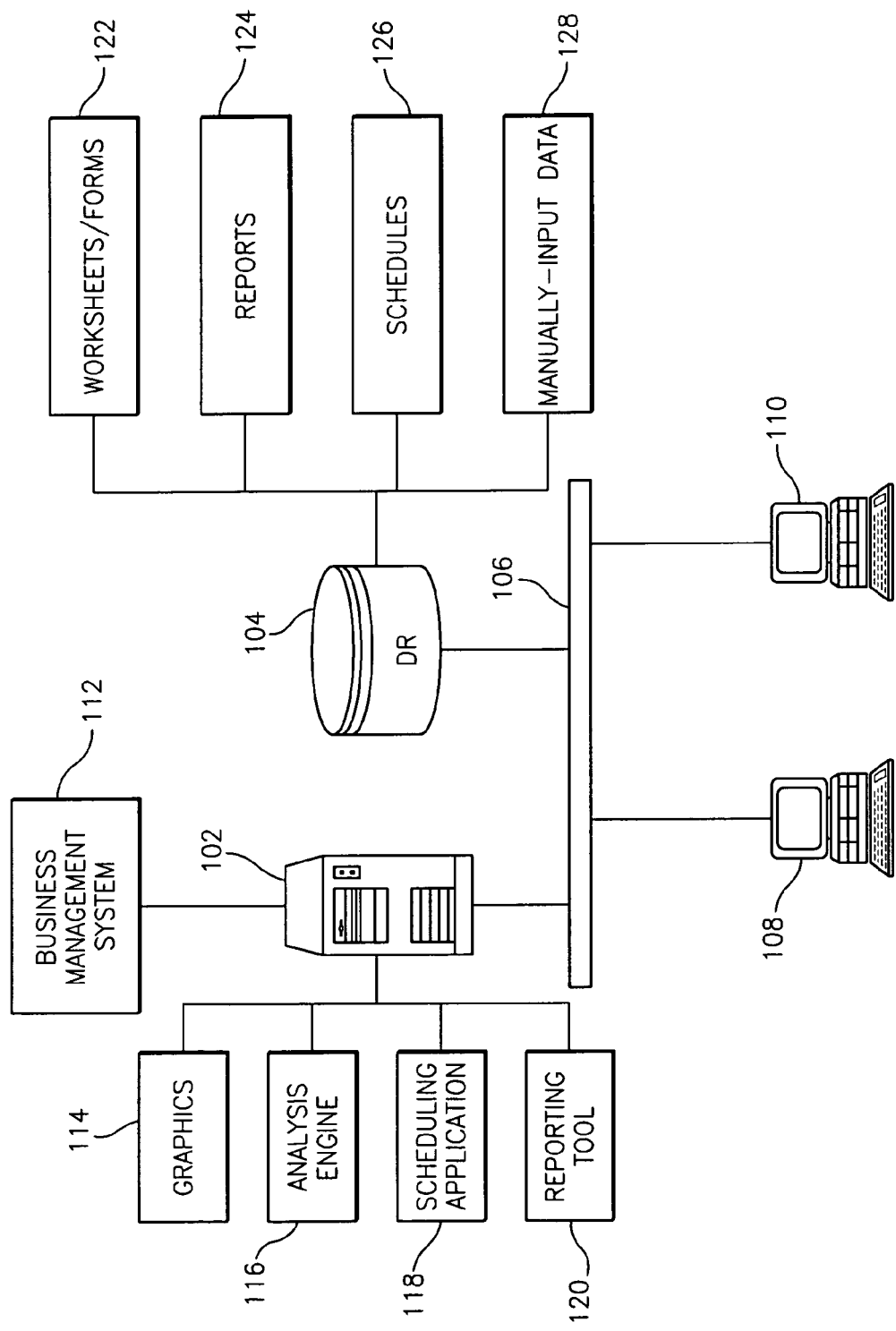
FIG. 1 is a block diagram of a system upon which the business management system may be implemented in exemplary embodiments.

The business management system may be implemented in a network system such as the one depicted in FIG. 1. FIG. 1 includes a host system 102 executing the business management system 112. Host system 102 is in communication with a data repository 104 via a network 106. Alternatively, host system 102 and data repository 104 may comprise one unit, such as for example, a mainframe computer. Host system 102 is in communication with client systems 108 and 110 via network 106. Host system 102 executes various applications including a graphics application 114, an analysis engine 116, a scheduling application 118, and a reporting tool 120 as described further herein. Data repository 104 stores a variety of documents and data including worksheets 122, reports 124, schedules 126, and manually input data 128 which are created and/or utilized by the business management system.

Host system 102 may be a high-speed processor/server that executes applications 114-120 and services client systems 108 and 110. Data repository 104 is logically addressable by host system 102 and/or client systems 108 and 110 via network 106. Client systems 108 and 110 may each comprise a general-purpose desktop computer, laptop, or similar computer device. Client system 108 represents a computer device that is operated by a supervisor of an enterprise that utilizes the business management system. Client system 110 represents a computer device that is operated by a low-level employee of the business enterprise. Network 106 may comprise a local area network, wide area network, or other suitable networking infrastructure. Graphics application 114 may be an application such as a spreadsheet tool that provides charting and graphing capabilities. Analysis engine 116 may be a logic application that utilizes various algorithms to perform data analysis. Scheduling application 118 and reporting tool 120 may comprise any commercial or proprietary software that performs scheduling and reporting functions. These tools are widely known and will be readily understood by those skilled in the art.

Figure 2:
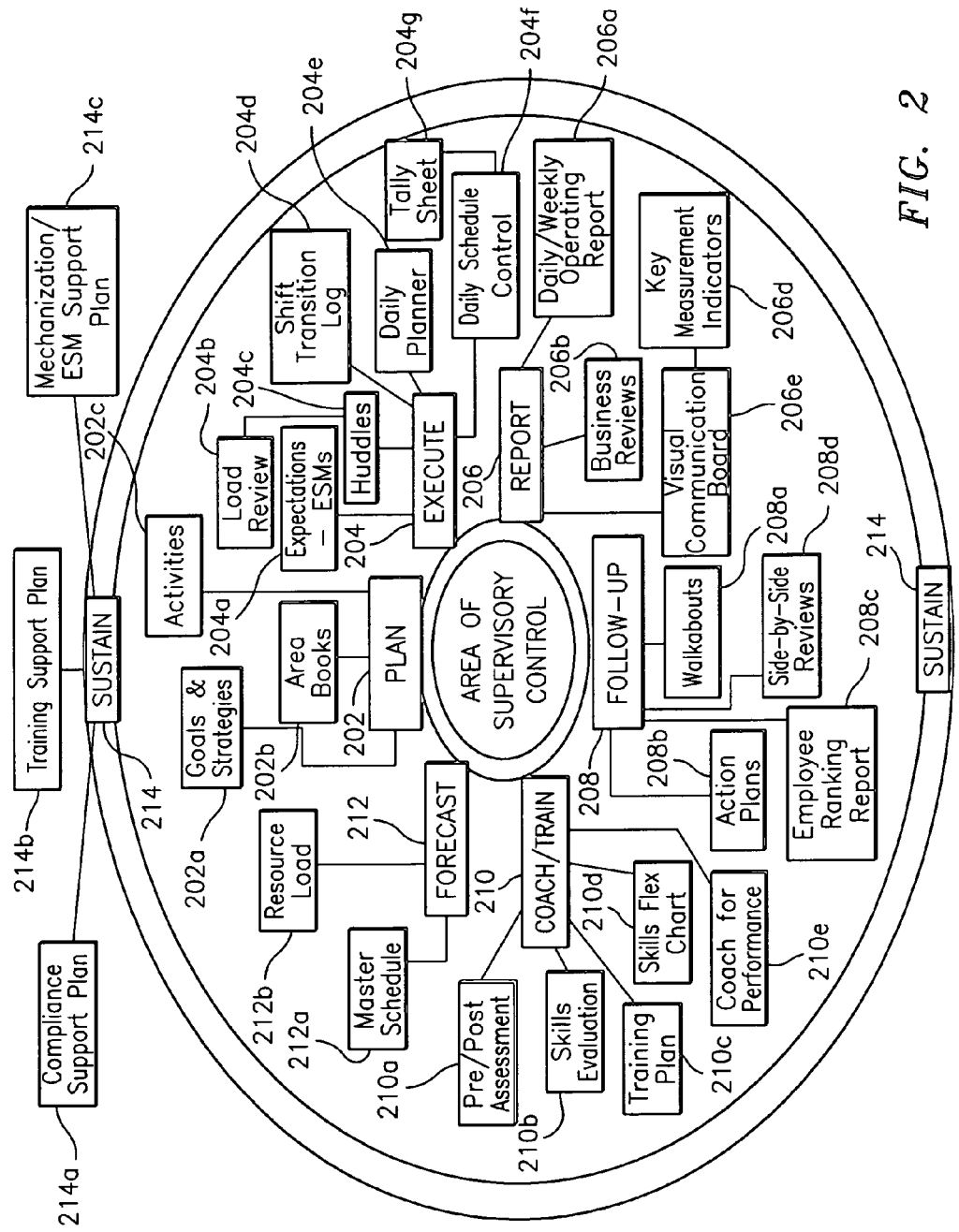
FIG. 2 is a diagram illustrating the components of the business management system model in exemplary embodiments.
Figure 3:
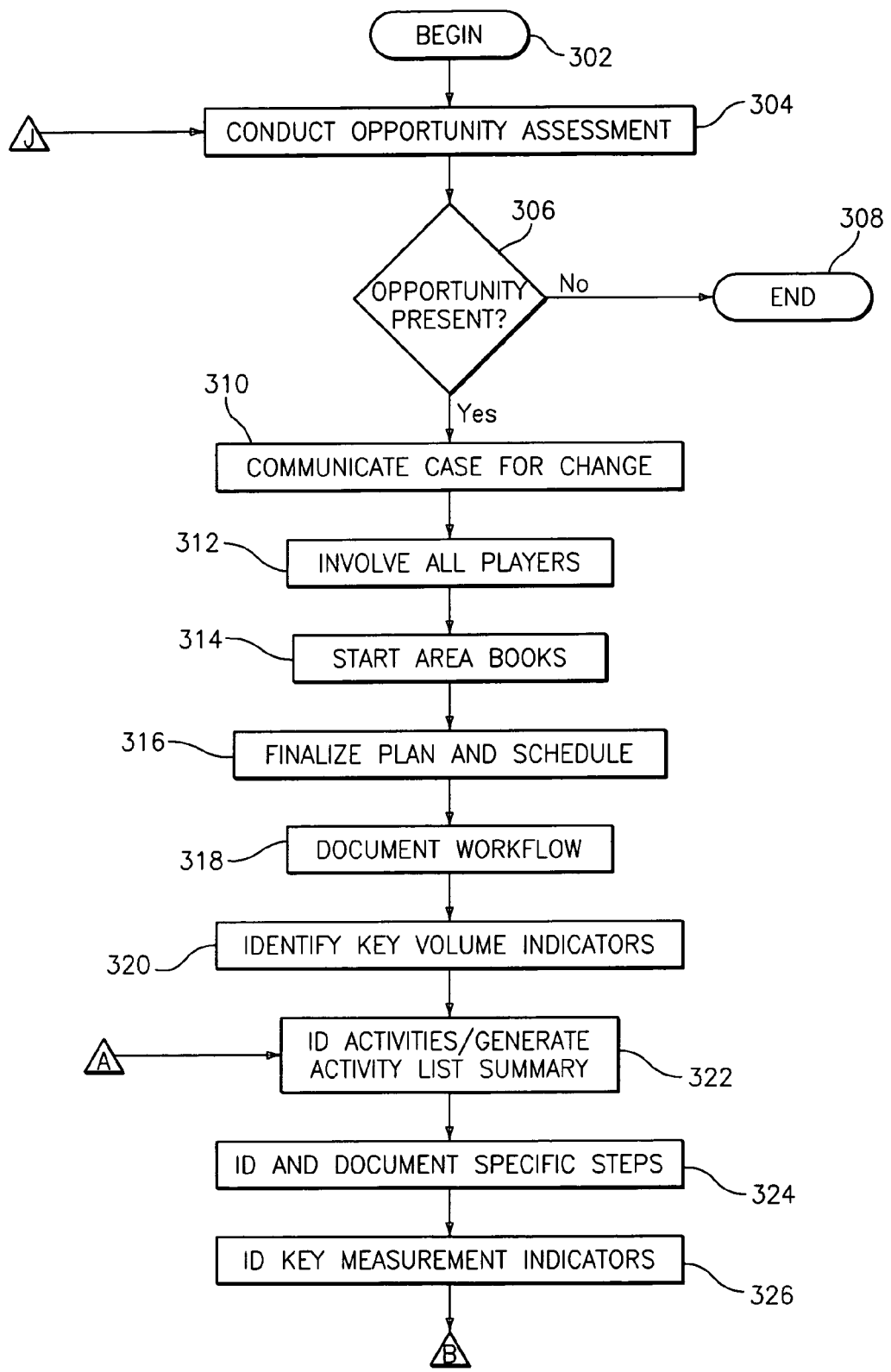
FIG. 3 is flowchart describing the plan phase of the business management system model in exemplary embodiments.
Figure 4:
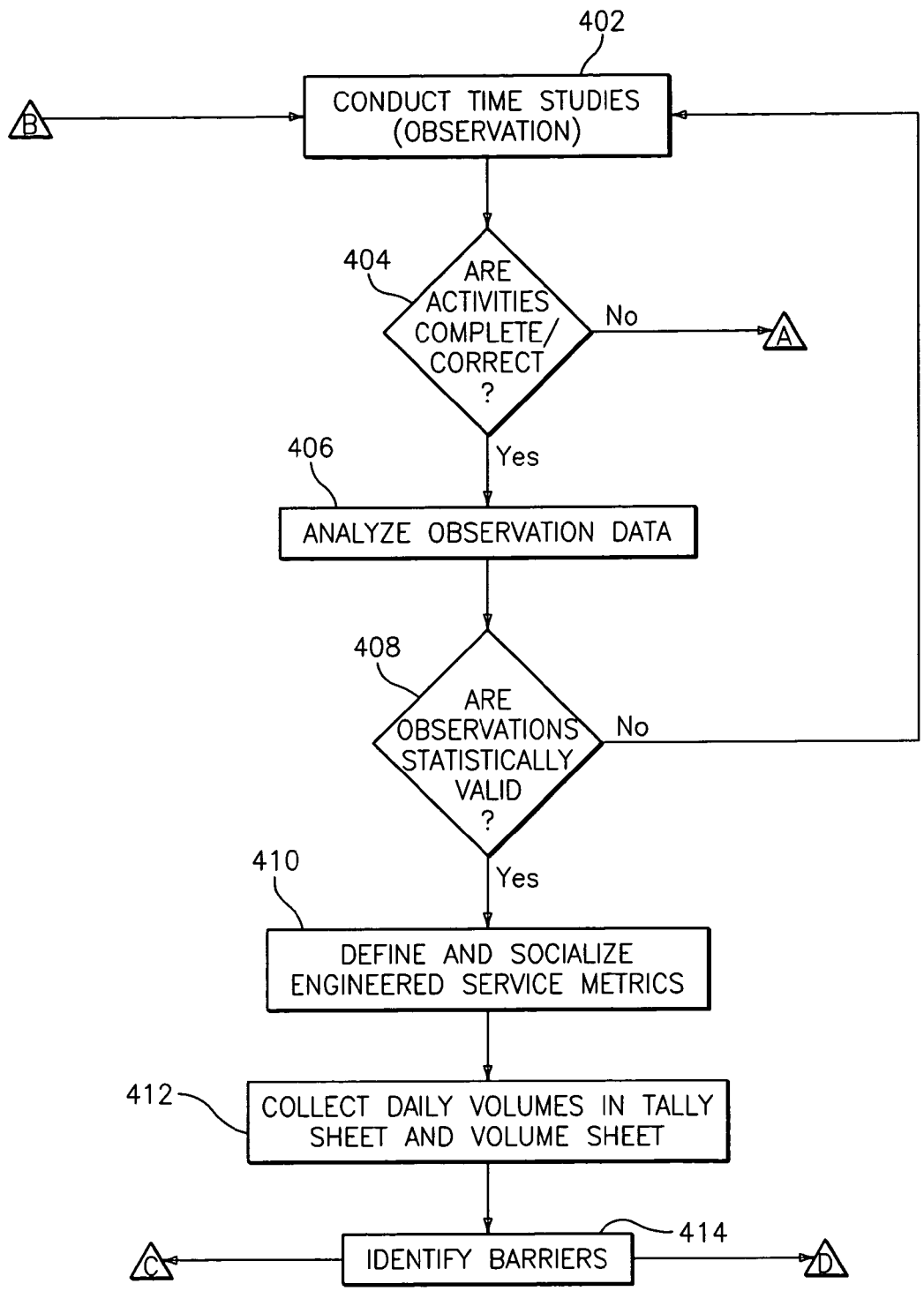
FIG. 4 is a flowchart describing the execute phase of the business management system model in exemplary embodiments.
Figure 5:
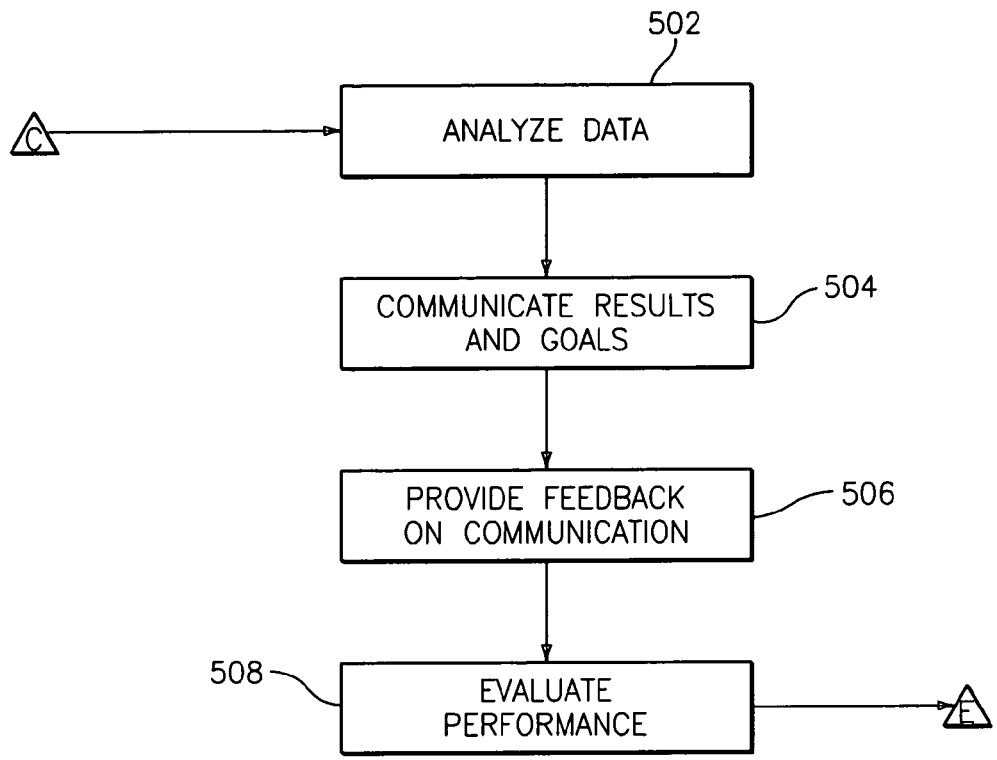
FIG. 5 is a flowchart describing the report phase of the business management system model in exemplary embodiments.
Figure 6:
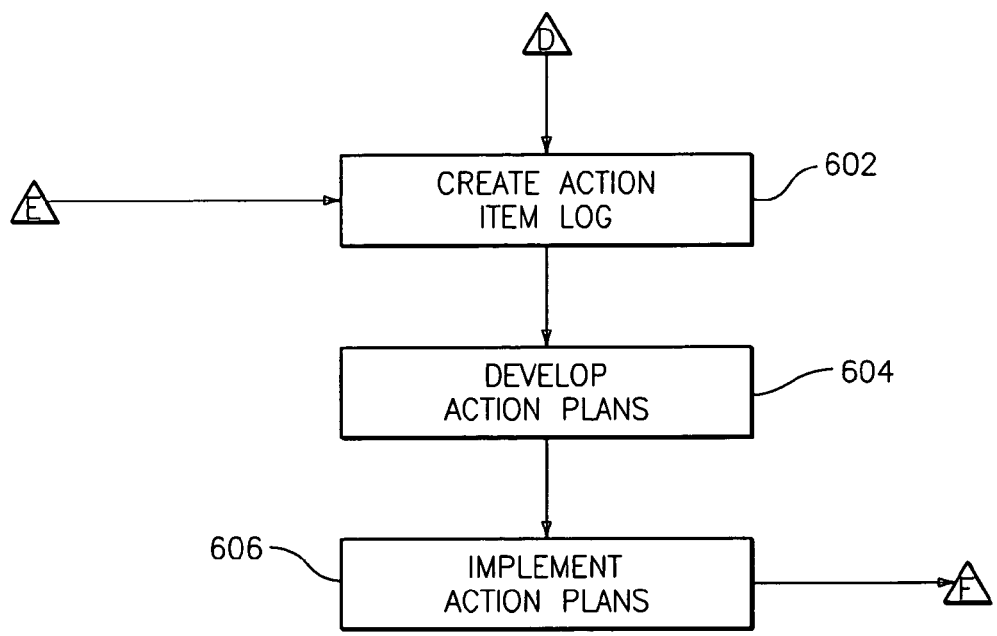
FIG. 6 is a flowchart describing the follow-up phase of the business management system model in exemplary embodiments.
Figure 7:
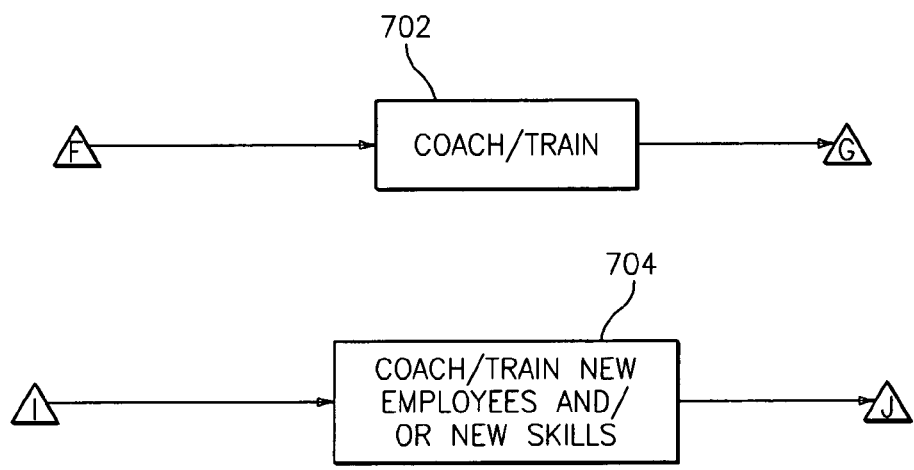
FIG. 7 is a flowchart describing the coach/train phase of the business management system model in exemplary embodiments.

The business management system model and its elements are described in FIG. 2. The model 200 includes a disciplined seven-phase approach to developing and maintaining a solid management training plan. The seven phases are further broken down and discussed in FIGS. 3-9. The observational data, analysis results, reports, and plans that pertain to a specific job role may be stored in a binder (also referred to herein as area book). This data, as well as data relating to all job functions are stored electronically in a database for easy access and retrieval.

The business management model 200 of FIG. 2 includes seven components or phases 202-214. Each of the phases, in turn, comprises one or more elements 202a-c, 204a-g, 206a-d, 208a-d, 210a-e, 212a-b, and 214a-c. The inner core of model 200 reflects the supervisory control over the entire seven-phase process, while the individual levels or components branch outward further away from the core in order to reflect a higher level of process detail. The seventh phase, sustain 214, envelopes the model 200 to reflect that this phase is ongoing throughout the implementation of the model.

Plan phase 202 includes a goals and strategies element 202a, area books 202b, and activities element 202c. Goals and strategies element 202a refers to the process of identifying opportunities, establishing goals for exploiting the opportunities, prioritizing the goals and strategies, and documenting the goals and strategies. This element ensures that effective communication of an opportunity is conducted and that the communication is directed to the appropriate individuals. The affected individuals may include personnel from a wide range of business and technical backgrounds. For example, relevant individuals may come from a high-level corporate office, and information technologist, operations staff, as well as a training department. Area books element 202b refers to the establishment of area books that contain relevant information tailored to the needs of each supervisor.

Activities element 202c refers to the mapping of processes using key volume indicators, identifying functional groups and activities assigned to these functional groups, and generating an activity list summary for each functional group. A sample activity list summary is shown in FIG. 10. An activity list summary is used to define work content for a particular work group and enables an administrator to match resources with workload conditions. An administrator (e.g., area manager) reviews and approves the activity list summary and a copy is maintained in the supervisor's area book. Details are specified for each activity in an activity detail summary that includes key volume indicators. An activity detail summary contains the work content for a work group and enables supervisors to understand each step involved in performing an activity on an activity list. An activity detail summary is developed for each activity listed in an activity list and is placed in an area book for the supervisor responsible for overseeing the activities.

Key volume indicators are used as a forecasting tool and are produced by comparing like centers (or work units) and validating differences between processes used. Based upon volumes, engineering service measurements (ESMs), and reasonable expectations established, these key volume indicators are generated and used to develop a master schedule, resource load, and activity list. Activity lists contain tasks and related behaviors associated with various jobs that are performed in a particular work area. Activity lists further provide a ratio of each activity in relation to key volume indicators.

Execute phase 204 includes an expectations element 204a, a daily load review component 204b, a huddles element 204c, a shift transition log element 204d, a daily planner element 204e, a daily schedule control element 204f, and a tally sheet element 204g. A variety of documents may be used for tracking and reporting activities conducted through the business management system. For example, based upon the nature of activity defined for a supervisor, various technical aids may be acquired for assisting the supervisor in performing the activity. Generally the supervisor will be conducting observations of employee behaviors during this phase. Supervisors may be trained for conducting observations in terms of the specific types of behaviors that should be tracked.

Results from observations conducted are entered in business management system 112 and statistical analysis is performed on the results via analysis engine 116. From this analysis, expectations (ESMs) 204a are developed and communicated to the affected individuals. ESMs refer to the established benchmarks set for an activity or best demonstrated practices (i.e., the optimum volume and quality of work conducted for each activity that assumes a fully trained employee, working at a constant rate with an average work mix, using the tools necessary to perform the activity, minus any lost time or operating problems encountered).

A daily load review refers to a tool that allows a supervisor to balance the workload for a work area by assessing the amount of work that needs to be done with the amount of labor needed to produce the work. The supervisor evaluates resource loads for each day to see how effective the workload planning was for the area. A daily planner 204e is used to document supervisory activities performed throughout the workday and daily huddles 204c are performed in order to establish daily expectations and synchronize information among individuals. The daily planner is a tool designed to assist members of a department with daily prioritizing and short-term planning. It also helps a supervisor load tasks into his/her available work hours in order manage unexpected surges in work along with day-to-day activities. A daily huddle refers to a management tool that allows a supervisor to understand and relay back any key developments that were noted from the previous day's work and to plan and prepare for the current day's operations. Specifically, a daily huddle is a meeting that is conducted for an area in which employees review their performance from the previous day, share lessons learned, and point out any relevance to future operations (e.g., identifying roadblocks, expectations, and new assignments/reassignments). Daily huddles are preferably conducted at the beginning of a workday or shift.

As work activities are performed by employees, the results are collected in database 128 and processed to generate a daily tally sheet 204g. A daily tally sheet provides detailed work data relating to performance and volumes for an activity. This information, in turn, is used to create a daily schedule control 204f. A sample daily schedule control is shown in FIG. 11. A daily schedule control is a structured follow-up tool that helps supervisors understand and relay off-schedule conditions. It enforces a disciplined short-interval follow-up to any barriers that have been identified and any potential off-schedule conditions that have been detected. It further provides a means for enabling a supervisor to compare actual work with planned work and helps to address issues early on before they become major problems. The daily schedule control provides information such as percentage of productivity data, percentage of overtime data, earned hours, and lost time. The daily schedule control is kept in the supervisor's area book for quick access and review. Capacity charts may be created by graphics application 114 using the information provided in the daily schedule control 204f. Shift transition log element 204d refers to a communication tool that allows management to follow up on issues that occur from one shift to the next so that they will not be overlooked as one supervisor's shift ends and another supervisor's shift begins. These are issues that have occurred during a shift and are believed to reoccur during the following shift.

Report phase 206 comprises a daily/weekly operating report element 206a, a business review element 206b, a visual communication board element 206c, and key measurement indicators 206d. These elements allow an administrator of the business management system to conduct analysis of the data gathered in the above process, as well as communicate the results to the appropriate individuals. These individuals are then presented with an opportunity to provide feedback on the results. The results may be presented in a visual format such as graphical charts or other means.

Daily/weekly operating report element 206a refers to a performance and reporting tool that identifies trends in key measurement indicators on a daily and weekly basis. Daily/weekly operating reports summarize information gained from the previous day's work, as well as for the week, and includes planned and actual items produced, hours worked, and other indicators (e.g., performance, effectiveness, service, and quality). Action plans are developed using information in the daily/weekly operating report. A sample daily/weekly operating report is shown in FIG. 12.

The business review element 206b refers to a meeting in which area managers present a variety of information elements to higher level entities such as corporate directors or company vice presidents. Information elements presented include daily schedule controls, action plans, capacity graphs, daily/weekly operating reports, among other types of information. Areas managers that are successfully utilizing the business management system may be recognized, and any deficiencies relating to the utilization of the business management system for other area managers may be identified as needing improvement. This meeting is preferably held on a monthly basis.

Key measurement indicators (KMIs) 206d refer to a measurement tool that measures performance, service, quality, and effectiveness of work performed. Key measurement indicators quantify results into meaningful measurements. KMIs are developed for each of these items measured. For example, in a customer service industry where performance is to be measured, a KMI is determined by assessing an activity that drives the functions for an area (e.g., a reasonable number of calls expected to be received at the work area). A base performance is determined for this function (e.g., a time period from which to begin subsequent measures is established). Then the actual value for the current period (e.g., week) is identified utilizing the KMI 'number of calls' and the base performance. The actual value is then compared with subsequent values (e.g., actual value information for the next week) to determine a percentage of change in performance from one time period to the next.

In a customer service industry where quality is to be measured, a KMI is determined by assessing an activity that defines the quality of work in an area (e.g., the reasonable speed in which a customer call should be answered). A base performance is determined for this quality (e.g., a time period from which to begin subsequent measures is established). Then the actual value for the current period (e.g., week) is identified utilizing the KMI 'average speed' and the base performance. The actual value is then compared with subsequent values (e.g., actual value information for the next week) to determine a percentage of change in quality from one time period to the next.

In a customer service industry where service is to be measured, a KMI is determined by assessing an activity that defines the service performed in the work area (e.g., percentage of telephone calls answered within the average speed established above). A base for the service is determined (e.g., actual value information for the next week) to determine a percentage of change in service from one time period to the next.

In a customer service industry where effectiveness is to be measured, a KMI is determined by assessing an activity that defines the effectiveness within a work area (e.g., the number of repeat calls received on the same issue). A base for the effectiveness KMI is determined (e.g., actual value information for the next week) to determine a percentage of change in effectiveness from one time period to the next.

Visual communication board element 206c refers to a reporting tool that enables organization-wide views of current performance data. The visual communication board includes information from goals and strategies element 202a, action plans 208b, daily/weekly operating reports 206a, key measurement indicators 206d, capacity charts, lost time data, and other sources to produce a quick reference for area performance. The visual communication board is preferably located in a central location within a supervisor's area that is visible to all employees in that area.

In the follow-up phase 208, a roadmap is developed for resolving any issues and for improving existing processes. Action plans 208b for removing barriers include detailed action items and metrics for guiding individuals through the roadmap. Action plans include specific due dates for listed steps to be completed, and specifies the individuals responsible for the accomplishment of those steps. Feedback is also used in implementing a detailed action plan. A sample action plan is shown in FIG. 13. Walkabouts 208a, side-by-side reviews 208d, and an employee ranking report 208c are used to reinforce coaching opportunities. An employee ranking report is used to rank employees based upon their initial screening (e.g., observations) in order to identify any specific training requirements needed. The information provided in the ranking report details specific deficiencies that can be used to link a specific training program with the employee.

In the coach/train phase 210, employee training is scheduled and conducted 210c and individuals are coached for improved performance 210e. Individuals are evaluated to determine their current skill levels 210b and skills flexibility 210d. Pre- and post-training assessments 210a are conducted during this phase as well. Pre-post assessment element 210a is an evaluation tool that helps supervisors assess the skills training needs of each individual specific to one of three key skill areas: basic, fundamental, and advanced. Basic skill areas define the basic foundational elements needed to perform a job. Fundamental skill areas define an advanced set of skills desirable for optimally performing a job. Advanced skill areas define unique or special skills that may be required to perform a job, such as operating a special type of equipment or machine. The pre- and post-training assessments serve two purposes: pre-assessment quickly calibrates an employee's skills prior to training, while post-assessment measures what an employee has retained after training. Skills flexibility element 210d identifies the skills and training a workgroup needs to effectively and efficiently complete assigned work. It identifies the relative strengths and weaknesses within a team from a training standpoint. Employees are ranked according to skill in order to determine the total number of qualified people available for performing jobs in an assigned department, which in turn, helps to identify any training needs. This information may be entered into graphics tool 114 in order to produce a visual picture of qualification statuses. Coaching for performance element 210e is a tool used to identify best practices in order to close gaps between skill levels of employees in an area. This element defines the performance level of the work area, so potential barriers can be detected and removed from the daily environment.

Forecast phase 212 uses operating reports (e.g., daily/weekly operating report 206a) resulting from the execution of report phase 206 for resource planning. Operating capabilities and required resources are identified and used to plan and forecast future needs. Daily operating reports and statistics are used in the forecast phase 212 to generate a resource load 212b, which determines day-to-day force to load requirements and a master schedule 212a that details a long-term force plan. These schedules may be generated by scheduling application 118.

Sustain phase 214 ensures that all improvements (e.g., compliances 214a) acknowledged via the processes above are sustained and continuously evaluated for currency. The compliance support plan 214a enables an area manager to review and measure a supervisor's understanding of, and commitment to, the elements of the business management system on three levels: conceptual, mechanical, and ownership. It also allows the area manager to identify any noncompliances and provide timely feedback to the respective supervisor in order to address and correct the issues. Mechanized requirements 214c and a training support plan 214b are included to ensure sustainability of these processes. Information relating to these sustaining elements is documented and used throughout the business management model processes to ensure ongoing and future success.

Embodiments of the business management system include a seven-phase approach as described in FIGS. 3-8. The plan phase process begins at step 302 whereby an opportunity assessment is conducted at step 304. Based upon the results of the assessment, it is determined whether or not one or more opportunities are present at step 306. An opportunity refers to a task, activity, or behavior that may be improved upon. If not, the process ends at step 308. If an opportunity is present at step 306, an administrator of the business management system model communicates this opportunity and presents reasons for why the opportunity is relevant at step 310. At step 312, all individuals and/or departments that are affected by, or responsible for, this opportunity are involved. An area book, as described above in FIG. 2, is generated for each individual involved with the opportunity. The area book is used for documenting and storing information needed for implementing the model at step 314. At step 316, a plan and schedule are generated for exploiting the opportunity. Associated workflow processes are identified and documented at step 318. Key volume indicators are also identified at step 320. Activities needed for further developing the opportunity are identified at step 322. An activity list is generated for these activities. These activities may be identified through current business practices that are successful or otherwise desirable. They may also be obtained from the process conducted at step 404 in the execute phase of FIG. 4. Specific steps that need to be performed are adopted and documented at step 324. Any key measurement indicators are identified at step 326. Upon completion of the plan phase, the process proceeds to the execute phase described in FIG. 4.

At step 402, time studies are conducted by selected individuals. Based upon the studies, it is determined whether the activities specified in the plan phase are complete and correct at step 404. If not, the process returns to the plan phase at step 322 whereby the activities are revised accordingly. If the activities are complete and accurate at step 406, it is determined whether the observations (e.g., time studies) are statistically valid at step 408. If not, the process returns to step 402 where further time studies are conducted. Otherwise, the process proceeds to step 410 whereby engineered service metrics are defined. A tally sheet and volume sheet are utilized for collecting daily volumes at step 412. Any barriers or issues are identified at step 414. The barriers identified are used in both the reporting phase of FIG. 5 as well as the follow-up phase of FIG. 6 as described herein.

In the reporting phase, the data gathered from the above processes are analyzed at step 502. The analysis includes the issues identified in step 414 of FIG. 4. The results are communicated to involved individuals and/or departments at step 504. From this analysis, various goals are identifiable. These are communicated to the relevant individuals as well. At step 506, the individuals and/or departments are provided with an opportunity to relay feedback to the information presented at step 504. A performance evaluation is conducted at step 508 and the process continues to the follow-up phase of FIG. 6.

At step 602, an action item log is created that includes the issues identified in step 414, as well as the results of the performance evaluation conducted at step 508. From the action item log, a detailed action plan is developed at step 604. With the action plan in place, the activities presented therein are then implemented at step 606 and the process continues to the coach/train phase of FIG. 7.

At step 702, a supervisor or manager utilizes the specific items identified in the action plan to coach and/or train an employee. The process then continues to the forecast phase of FIG. 8. Additionally, the coach/train phase may be implemented as a result of activities conducted at step 912 of the sustain phase of FIG. 9. This may be the case where new skills are determined to be needed by a business enterprise.

Figure 8:
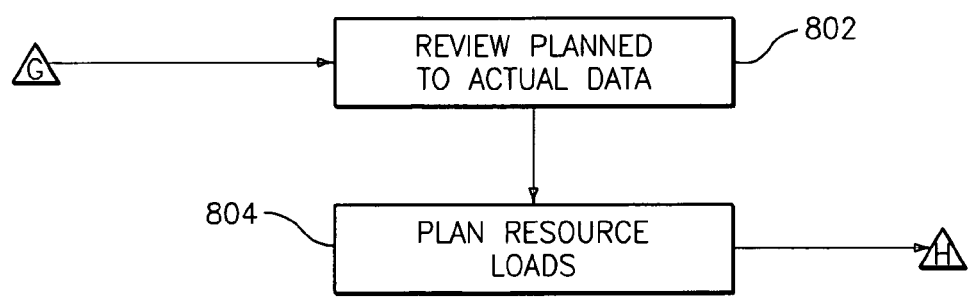
FIG. 8 is a flowchart describing the forecast phase of the business management system model in exemplary embodiments.
Figure 9:
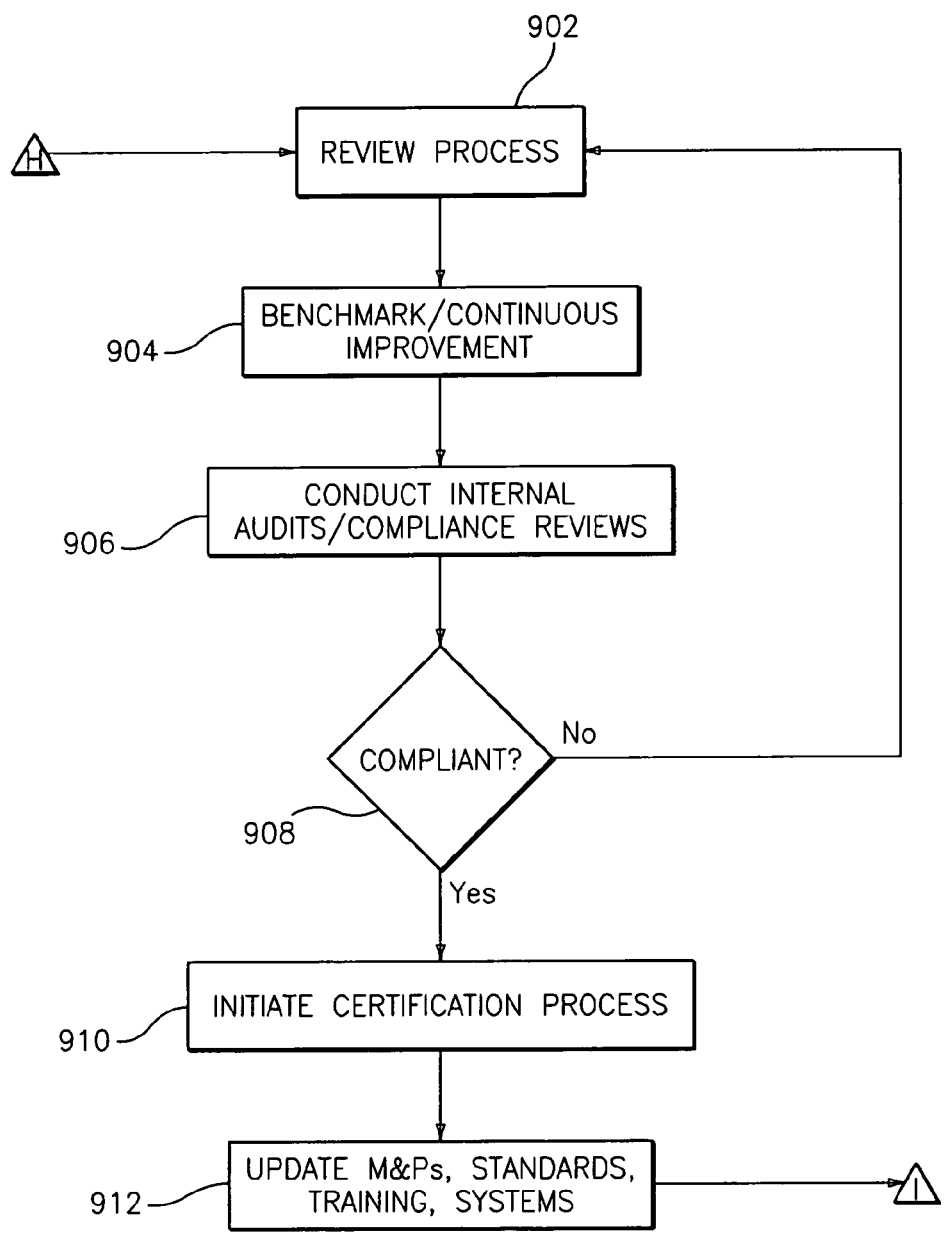
FIG. 9 is a flowchart describing the sustain phase of the business management system model in exemplary embodiments.

The forecast phase of FIG. 8 continues from the coach/train phase in which a review of the 'planned-to-actual' data is conducted at step 802. This data is acquired from step 702 and relates to the actual progress made by employees who have been coached in contrast to the planned progress for a given time period. At step 804 resource loads are planned based upon the review conducted at step 802. The process then continues to the sustain phase of FIG. 9.

At step 902, the process as developed to date is reviewed. The review includes identifying progress made as well as any deficiencies noted. Benchmarks for improvement and maintenance are developed at step 904. At step 906, internal audits and compliance reviews are conducted. If an audit reveals a non-compliance in a specific area at step 908, the process is once again reviewed at step 902 to identify the cause of non-compliance. Otherwise, a certification process is initiated to acknowledge the compliance at step 910. Any manuals, programs, standards, training, and/or systems benefiting from the compliance are updated at step 912. These activities may then be used to coach and train employees as described in FIG. 7 at step 704.

As can be seen from the above descriptions the business management system provides a consistent model for supervisors and management personnel to manage a business utilizing productivity standards, process management, and management control systems. The business management system enables accomplishment of service metrics while substantially driving cost efficiencies. The methodology utilized by the business management system allows for efficient movement of personnel to new areas while building on past successes.

As described above, embodiments of the invention may include computer-implemented processes and apparatuses for practicing those processes. Embodiments may also include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments may further include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A computer implemented method of providing a disciplined approach for conducting business management activities in a call center operating on one or more computer processors, the computer processors in communication with a host system computer over a communication network, the method comprising:

developing an activity list of tasks and behaviors that relate to an identified opportunity;

performing a time study of observable behaviors associated with the activity list in the call center;

collecting, on the computer processors, data resulting from the time study and from performance of work activities, wherein the collecting comprises generating a tally sheet, a daily load review and a daily schedule control;

defining key measurement indicators for the observable behaviors;

identifying issues presented as a result of analyzing the collected time study data;

generating and implementing a roadmap for resolving the identified issues;

training individuals affected by the roadmap in accordance with action items contained in the roadmap;

updating a database of roadmaps based upon notification of a compliance resulting from an activity assessment; and forecasting, on the computer processors, future call center resource requirements based upon reports generated as a result of the collecting data, identifying issues, and training individuals, wherein the future resource requirements are forecasted using the training by comparing actual progress made by individuals to planned progress for the individuals, the planned progress derived in response to a training assessment;

wherein generating a roadmap includes ranking individuals amongst one another based upon observable behaviors conducted as observed in an initial screening to identify training requirements and creating an action plan and, wherein further, training the individuals includes linking a corresponding training program with the individuals in response to the initial screening, the action plan including detailed action items and metrics that guide the individuals through the roadmap; and wherein the observable behaviors comprise at least one of determining a percentage change in a number of repeat calls on a same issue over time for a work area by comparing the number of calls on the same issue with the key measurement indicators and determining a percentage change in a speed in which a customer call is answered over time for a work area by comparing a measurement of a speed in which a customer call is answered with key measurement indicators.

2. The method of claim 1, wherein developing an activity list includes:

establishing goals and strategies for exploiting the opportunity;

documenting the goals and strategies; and communicating the goals and strategies to affected individuals.

3. The method of claim 2, further comprising using information in the activity list to develop an activity detail summary comprising:
documenting current workflow conditions and requirements;
identifying key volume indicators;
identifying activities and creating an activity list summary; and
identifying key measurement indicators.

4. The method of claim 3, wherein the key volume indicators are derived by:
comparing like work units and validating differences between processes used in the like work units; and
establishing engineering service metrics and reasonable expectations resulting from the comparing like work units;
wherein the engineering service metrics include best demonstrated practices for activities conducted in the work units; and
wherein the key measurement indicators measure performance, service, quality, and effectiveness of work performed and quantify results into relevant measurements.

5. The method of claim 1, wherein training the individuals further includes:
evaluating the individuals to determine current skill levels and skills flexibility, the skills flexibility identifying relative strengths and weaknesses within a team of individuals from a training standpoint; and
conducting a pre-training assessment to calibrate the skills of the individuals prior to training, and conducting a post-training assessment to measure the skills retained by the individuals after conducting the training;
wherein the pre-training assessment and the post-training assessment assess skills training needs for three skill areas, including:
basic skills that define basic foundational elements needed to perform a job;
fundamental skills that define an advanced set of skills desirable for optimally performing a job; and
advanced skill areas that define unique or special skills required to perform a job.

6. The method of claim 1, wherein performing a time study of observable behaviors further includes:
identifying behaviors to observe;
observing the behaviors;
determining statistical validity of observations;
defining metrics for the behaviors; and
documenting the observations.

7. The method of claim 1, wherein the tally sheet specifies detailed work volumes, the daily load review comprises the calculation of the work volume to be completed and an amount of labor to produce the work volume, and the daily schedule control is created using the tally sheet and the daily load review, the daily schedule control including:
productivity data;
percentage of overtime data;
earned hours; and
lost time;
wherein the method further comprises:
conducting a daily employee performance review including:
meeting with employees to review prior day performance;
gathering lessons learned; and
applying lessons learned to future operations; and
generating a daily planner including:
gathering the results of the daily load review;
gathering the results of the daily schedule control; and
gathering the results of the daily performance review.

8. A storage medium encoded with machine-readable computer program code for providing a disciplined approach for conducting business management activities in a call center, the storage medium including instructions for causing a server to implement a method, comprising:
developing an activity list of tasks and behaviors that relate to an identified opportunity;
performing a time study of observable behaviors associated with the activity list in the call center;
collecting data resulting from the time study and from performance of work activities, wherein the collecting comprises generating a tally sheet, a daily load review and a daily schedule control;
defining key measurement indicators for the observable behaviors;
identifying issues presented as a result of analyzing the collected time study data;
generating and implementing a roadmap for resolving the identified issues;
training individuals affected by the roadmap in accordance with action items contained in the roadmap;
updating a database of roadmaps based upon notification of a compliance resulting from an activity assessment; and
forecasting future call center resource requirements based upon reports generated as a result of the collecting data, identifying issues, and training individuals, wherein the future resource requirements are forecasted using the training by comparing actual progress made by individuals to planned progress for the individuals, the planned progress derived in response to a training assessment;
wherein generating a roadmap includes ranking individuals amongst one another based upon observable behaviors conducted as observed in an initial screening to identify training requirements and creating an action plan and, wherein further, training the individuals includes linking a corresponding training program with the individuals in response to the initial screening, the action plan including detailed action items and metrics that guide the individuals through the roadmap; and
wherein the observable behaviors comprise at least one of determining a percentage change in a number of repeat calls on a same issue over time for a work area by comparing the number of calls on the same issue with the key measurement indicators and determining a percentage change in a speed in which a customer call is answered over time for a work area by comparing a measurement of a speed in which a customer call is answered with key measurement indicators.

9. The storage medium of claim 8, wherein developing an activity list includes:
establishing goals and strategies for exploiting the opportunity;
documenting the goals and strategies; and
communicating the goals and strategies to affected individuals.

10. The storage medium of claim 9, further comprising instructions for causing the server to implement:
using information in the activity list to develop an activity detail summary comprising:
documenting current workflow conditions and requirements;
identifying key volume indicators;

identifying activities and creating an activity list summary; and identifying key measurement indicators.

11. The storage medium of claim 10, wherein the key volume indicators are derived by:
comparing like work units and validating differences between processes used in the like work units; and
establishing engineering service metrics and reasonable expectations resulting from the comparing like work units;
wherein the engineering service metrics include best demonstrated practices for activities conducted in the work units; and
wherein the key measurement indicators measure performance, service, quality, and effectiveness of work performed and quantify results into relevant measurements.

12. The storage medium of claim 8, wherein training the individuals further includes:
evaluating the individuals to determine current skill levels and skills flexibility, the skills flexibility identifying relative strengths and weaknesses within a team of individuals from a training standpoint; and
conducting a pre-training assessment to calibrate the skills of the individuals prior to training, and conducting a post-training assessment to measure the skills retained by the individuals after conducting the training;
wherein the pre-training assessment and the post-training assessment assess skills training needs for three skill areas, including:
basic skills that define basic foundational elements needed to perform a job;
fundamental skills that define an advanced set of skills desirable for optimally performing a job; and
advanced skill areas that define unique or special skills required to perform a job.

13. The storage medium of claim 8, wherein the performing a time study of observable behaviors further includes:
identifying behaviors to observe;
observing the behaviors;
determining statistical validity of observations;
defining metrics for the behaviors; and
documenting the observations.

14. The storage medium of claim 8, wherein the tally sheet specifies detailed work volumes, the daily load review comprises the calculation of the work volume to be completed and an amount of labor to produce the work volume, and the daily schedule control is created using the tally sheet and the daily load review, the daily schedule control including:
productivity data;
percentage of overtime data;
earned hours; and
lost time;
wherein the method further comprises:
conducting a daily employee performance review including:
meeting with employees to review prior day performance;
gathering lessons learned; and
applying lessons learned to future operations; and
generating a daily planner including:
gathering the results of the daily load review;
gathering the results of the daily schedule control; and
gathering the results of the daily performance review.

15. A system for providing a disciplined approach for conducting business management activities in a call center, comprising:
a server;
a business management system executing on the server, the business management system implementing a method, comprising:
developing an activity list of tasks and behaviors that relate to an identified opportunity;
performing a time study of observable behaviors associated with the activity list in the call center;
collecting data resulting from the time study and from performance of work activities, wherein the collecting comprises generating a tally sheet, a daily load review and a daily schedule control;
defining key measurement indicators for the observable behaviors;
identifying issues presented as a result of analyzing the collected time study data;
generating and implementing a roadmap for resolving the identified issues;
training individuals affected by the roadmap in accordance with action items contained in the roadmap;
updating a database of roadmaps based upon notification of a compliance resulting from an activity assessment; and
forecasting future call center resource requirements based upon reports generated as a result of the collecting data, identifying issues, and training individuals, wherein the future resource requirements are forecasted using the training by comparing actual progress made by individuals to planned progress for the individuals, the planned progress derived in response to a training assessment;
wherein generating a roadmap includes ranking individuals amongst one another based upon observable behaviors conducted as observed in an initial screening to identify training requirements and creating an action plan and, wherein further, training the individuals includes linking a corresponding training program with the individuals in response to the initial screening, the action plan including detailed action items and metrics that guide the individuals through the roadmap; and
wherein the observable behaviors comprise at least one of determining a percentage change in a number of repeat calls on a same issue over time for a work area by comparing the number of calls on the same issue with the key measurement indicators and determining a percentage change in a speed in which a customer call is answered over time for a work area by comparing a measurement of a speed in which a customer call is answered with key measurement indicators.

16. The system of claim 15, wherein developing an activity list includes:
establishing goals and strategies for exploiting the opportunity;
documenting the goals and strategies; and
communicating the goals and strategies to affected individuals, the method further comprising:
using information in the activity list to develop an activity detail summary comprising:
documenting current workflow conditions and requirements;
identifying key volume indicators;
identifying activities and creating an activity list summary; and
identifying key measurement indicators.

17. The system of claim 16, wherein the key volume indicators are derived by:
comparing like work units and validating differences between processes used in the like work units; and establishing engineering service metrics and reasonable expectations resulting from the comparing like work units;

wherein the engineering service metrics include best demonstrated practices for activities conducted in the work units; and wherein the key measurement indicators measure performance, service, quality, and effectiveness of work performed and quantify results into relevant measurements.

18. The system of claim 15, wherein training the individuals further includes:

evaluating the individuals to determine current skill levels and skills flexibility, the skills flexibility identifying relative strengths and weaknesses within a team of individuals from a training standpoint; and conducting a pre-training assessment to calibrate the skills of the individuals prior to training, and conducting a post-training assessment to measure the skills retained by the individuals after conducting the training;

wherein the pre-training assessment and the post-training assessment assess skills training needs for three skill areas, including:

basic skills that define basic foundational elements needed to perform a job;

fundamental skills that define an advanced set of skills desirable for optimally performing a job; and advanced skill areas that define unique or special skills required to perform a job.

19. The method of claim 4, wherein the observable behaviors are percentage of telephone calls answered within an average speed, the average speed determined by the key measurement indicators.

* * * * *